United States Patent
Kakivaya et al.

(10) Patent No.: US 7,483,943 B2
(45) Date of Patent: Jan. 27, 2009

(54) RELIABLE MESSAGING USING CLOCKS WITH SYNCHRONIZED RATES

(75) Inventors: Gopala Krishna R. Kakivaya, Sammamish, WA (US); David E. Langworthy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 10/946,386

(22) Filed: Sep. 21, 2004

(65) Prior Publication Data
US 2006/0064464 A1    Mar. 23, 2006

(51) Int. Cl.
G06F 15/16 (2006.01)
G06F 7/04 (2006.01)
G06F 7/58 (2006.01)
H04L 9/00 (2006.01)
H04L 9/32 (2006.01)
G06K 9/00 (2006.01)
G06K 19/00 (2006.01)

(52) U.S. Cl. .............. 709/203; 709/206; 713/171; 726/9

(58) Field of Classification Search ............... 709/203, 709/206; 713/171; 726/9
See application file for complete search history.

(56) References Cited

U.S. PATENT DOCUMENTS

| | | | | |
|---|---|---|---|---|
| 5,109,384 A | * | 4/1992 | Tseung | 714/748 |
| 5,164,988 A | * | 11/1992 | Matyas et al. | 713/156 |
| 5,200,999 A | * | 4/1993 | Matyas et al. | 380/277 |
| 5,201,000 A | * | 4/1993 | Matyas et al. | 380/30 |
| 6,381,241 B1 | * | 4/2002 | Ghirnikar et al. | 370/394 |
| 7,080,385 B1 | * | 7/2006 | Collison et al. | 719/318 |

OTHER PUBLICATIONS

DARPA. "Request for Comments (RFC) 793: Transmission Control Protocol", Sep. 1981, 91 pages.*

* cited by examiner

*Primary Examiner*—George C Neurauter, Jr.
(74) *Attorney, Agent, or Firm*—Workman Nydegger

(57) ABSTRACT

The present invention extends to methods, systems, and computer program products for reliable messaging using clocks with synchronized rates. Embodiments of the present invention insure at-most-once delivery of messages. A source and a destination utilize clocks with synchronized rates. Messages are assigned Time-To-Live ("TTL") values such that state information is updated the source and removed at the destination when a corresponding message timer based on a TTL value expires. Accordingly, resources consumed to maintain state information at the destination can be freed up in a shorter period of time. The source can retransmit state information to the message destination if relevant state information has been removed. Message processor instance IDs insure at-most-once delivery when a message destination suffers an involuntary memory loss. Embodiments of the present invention can also be used for exactly-once-delivery, for example, when TTL values are infinite and instance IDs are not used.

10 Claims, 7 Drawing Sheets

RELIABLE MESSAGING USING CLOCKS WITH SYNCHRONIZED RATES

CROSS-REFERENCE TO RELATED APPLICATIONS

Not applicable.

BACKGROUND OF THE INVENTION

1. The Field of the Invention

The present invention relates to electronic messaging and, more particularly, to reliable messaging using clocks with synchronized rates.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

Although such electronic messaging advantageously allows for computing systems to exchange information, networks sometimes fail to deliver an electronic message. Depending on the importance of the electronic message, this could be quite harmful, and even catastrophic in some cases. Accordingly, reliable electronic messaging technologies have been developed.

Generally, the purpose of reliable messaging technologies is to deliver an electronic message from a source to a destination over a communication network that can loose, duplicate, reorder, and delay messages. Some electronic messages can be delivered and processed multiple times without harm. However, this is not true of all messages. In general, the safest approach is to ensure that messages are delivered once or not at all.

Some reliable messaging technologies implement acknowledgement messages. For example, Transmission Control Protocol (among other transport protocols) implements acknowledgement-based reliable messaging. Specifically, when a receiving computing system receives an electronic message from a sending computing system, the receiving computing system transmits an acknowledgement message to the sending computing system. Upon receipt of the acknowledgement message, the sending computing system may reliably take appropriate action given knowledge that the receiving computing system did in fact receive the electronic message. Otherwise, if the sending computing system does not receive the acknowledgement message, the sending computing system may take appropriate action such as retransmitting the electronic message. However sending an acknowledgement message for every received electronic message can result in a large number of acknowledgment messages that can potentially and unnecessarily consume network bandwidth.

In order to reduce the number of acknowledgement messages that need to be transmitted, cumulative acknowledgement has been developed. In cumulative acknowledgement, the sending computing system assigns a sequence number to each electronic message in a session. The sequence number for a given electronic message is typically incremented by one as compared to the previous electronic message in the session. The cumulative acknowledgement returned to the sending computing system includes the last sequence number of a contiguous series of sequence numbers representing successfully received messages. For example, suppose the receiving computing system received electronic messages having sequence numbers 1 through 50, and 55 through 99 but did not receive messages have sequence numbers 51-54. The receiving computing system may return a cumulative acknowledgment identifying only the received sequences However, when a sending computing system fails to receive an acknowledgment message (either individual or cumulative), there may be no way for the sending computing system to determine if the electronic message failed to be delivered or if the corresponding acknowledgment message failed to be delivered. That is, the sending computing system is "in doubt" with respect to whether the receiving computing system received an electronic message. In some environments, it may acceptable to deliver and process electronic messages multiple times. Thus, in these environments (e.g., involving static Web based content), a sending computing system may retransmit an electronic message when a corresponding acknowledgment message is not received. However, in other environments, it may not be acceptable to deliver and/or process electronic messages multiple times. Thus, in these other environments (e.g., involving banking transactions), a sending computer system will not retransmit an electronic message when a corresponding acknowledgment message is not received.

To relieve a sending computing system from having to a make a retransmission decision that may be incorrect, duplicate detection mechanisms have been design. Duplicate detection mechanisms decrease the likelihood of a receiving computing system processing the same message (or sequence of messages) more than once. To implement duplicate detection mechanisms, many receiving computer systems store state information associated with sending computer systems. For example, a receiving computer system can store an indication (e.g., in a database or list) of all the previous messages (or sequence of messages) that have previously been processed (e.g., identified by the IP address of the sending computing system and the sequence number). Thus, if a received message is present in the list (i.e., the message was previously received), the received message is discarded and re-processing of the message is avoided. Receiving computing systems typically store state information for long periods of time, such as, for example, the length of a session, (potentially forever) to significantly increase the chance of duplicate detection.

Due to the number of computing systems and number of messages exchanged on networks (e.g., on the Internet), the resources needed to implement duplicate detection can be quite large. For example, at any given time on the Internet, millions of computer systems are exchanging electronic messages. Even at a single receiving computer system (e.g., a retail server), it is not uncommon to interact with thousands, or even tens of thousands, of different sending computing systems in a given day. Thus, to implement duplicate detection, these receiving computing systems may store, for long periods of time, indications of every message that is received from every sending computer system. Since each sending computing system can potentially send thousands of messages as part of a transaction, receiving computing systems may need to maintain state for large quantities (e.g., millions or tens of millions) of messages.

Some other reliable messaging technologies utilize clocks that are synchronized to absolute times. However, synchronizing clocks to absolute times requires a synchronization protocol and high connectivity. On some networks, such as, for example, the Internet, high connectivity is virtually impossible since computer systems frequently connect to and disconnect from the network. Further, reliable messaging technologies utilizing clocks with absolute synchronized times can be more expensive to implement. Accordingly, reliable messaging technologies that maintain state are more frequently used and are often required when conformance with the more stringent operational parameters of absolute clock synchronization is not possible. Thus, many networked computer systems are required to allocate, potentially significant, resources for maintaining state related to communication with other computer systems. Therefore systems, methods, and computer program products that facilitate reliable messaging in a more resource efficient manner would be advantageous.

BRIEF SUMMARY OF THE INVENTION

The foregoing problems with the prior state of the art are overcome by the principles of the present invention, which are directed towards methods, systems, and computer program products for reliable messaging using clocks with synchronized rates. In some embodiments, a message destination processes a first copy of a message having a message ID and a Time-To-Live ("TTL") value. The message destination updates an interaction cache to indicate that a message having the message ID has been processed. The message destination receives a second copy of the message (also having the message ID) subsequent to processing the first copy of the message and prior to expiration of a countdown timer based on the TTL value. The message destination rejects the second copy of the message based on the interaction cache indicating that a message having the message ID was previously processed.

In other embodiments, a message destination processes a first copy of a message having an interaction ID, a message ID, and a TTL value. The message destination removes the progress information associated with the interaction ID from its interaction cache in response to expiration of the last countdown timer based on the TTL value specified in the processed messages. The message destination receives a second copy of the message subsequent to expiration of the countdown timer. The message destination sends a request for an indication of the progress of the interaction ID to a corresponding message source that has a clock rate that is synchronized with the clock rate of the message destination. The message destination receives an indication that the interaction has progressed such that a message having the message ID can be discarded. The message destination discards the second copy of the message.

In further embodiments, a message destination receives a first copy of a message that corresponds with a prior instance ID. Subsequently, the message destination processes the first copy of the message at a message processor instance that was initialized to have the prior instance ID. The message destination detects that the contents of memory utilized by the destination computer system were involuntarily lost. The message destination re-initializes the message processor instance to have an updated instance ID differing from the prior instance ID. The message destination receives a second copy of the message subsequent to re-initializing the message processor instance, the second copy of the message corresponding with the prior instance ID. The message destination rejects the second copy of the message since the second copy of the message corresponds to an instance ID that is different than the updated instance ID.

In additional embodiments, a message source sends a first copy of a message that has an interaction ID, a message ID, and a TTL value to a message destination that has a clock rate that is synchronized with the clock rate of the message source. The message source sends a second copy of the message having the interaction ID, the message ID, and an updated TTL value to the destination computer system subsequent to sending the first copy of the message. The updated TTL value calculated from the TTL value specified in the first copy of the message with the elapsed time since the first copy of the message was sent subtracted. The message source detects that the message TTL has expired. The message source updates an interaction cache to indicate that the message no longer requires acknowledgement.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
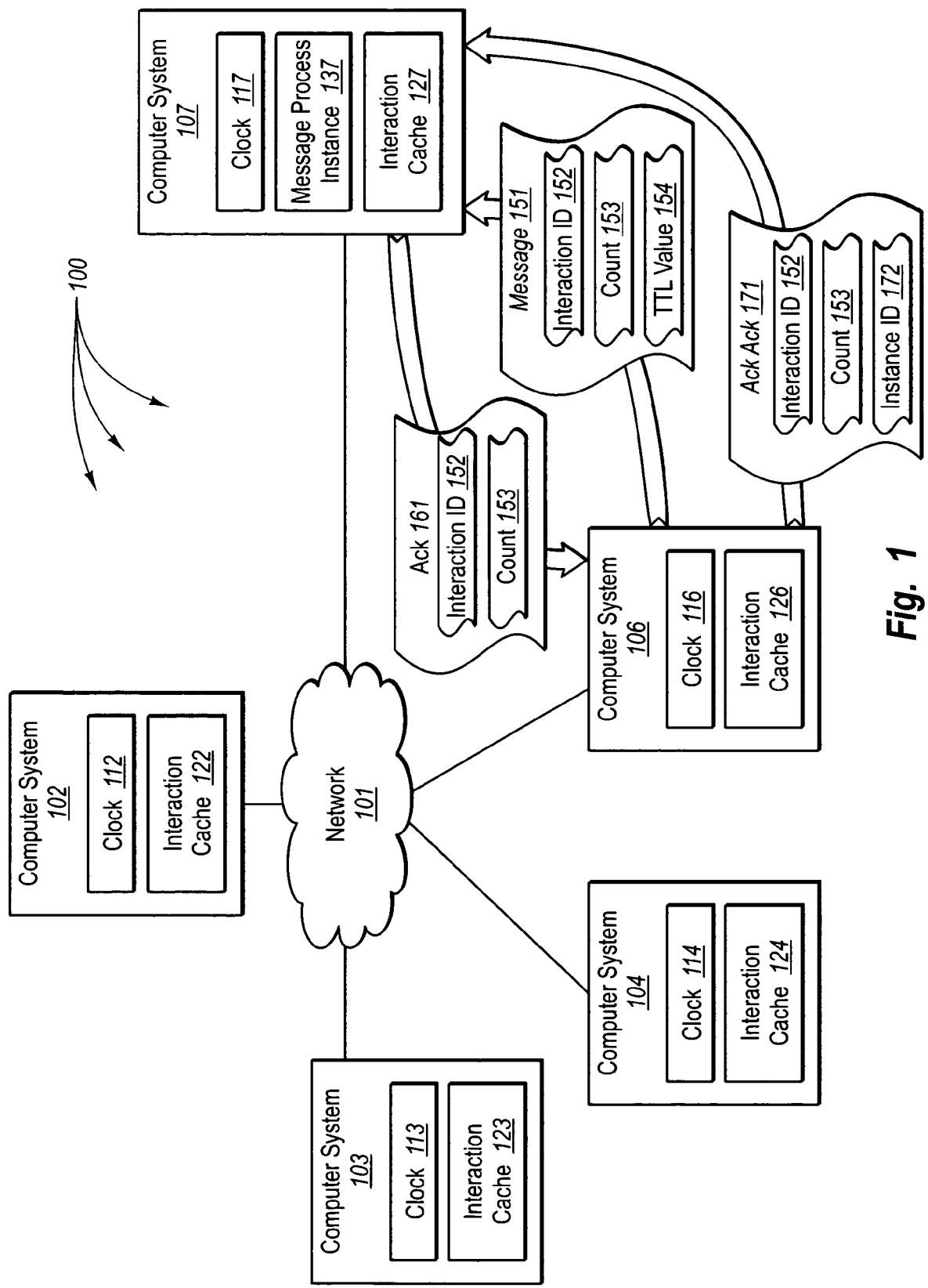
FIG. 1 illustrates an example of a computer architecture that facilitates reliable messaging using clocks with synchronized rates.

The foregoing problems with the prior state of the art are overcome by the principles of the present invention, which are directed towards methods, systems, and computer program products for reliable messaging using clocks with synchronized rates. In some embodiments, a message destination processes a first copy of a message having a message ID and a Time-To-Live ("TTL") value. The message destination updates an interaction cache to indicate that a message having the message ID has been processed. The message destination receives a second copy of the message (also having the message ID) subsequent to processing the first copy of the message and prior to expiration of a countdown timer based on the TTL value. The message destination rejects the second copy of the message based on the interaction cache indicating that a message having the message ID was previously processed.

In other embodiments, a message destination processes a first copy of a message having an interaction ID, a message ID, and a TTL value. The message destination removes the progress information associated with the interaction ID from its interaction cache in response to expiration of the last countdown timer based on the TTL value specified in the processed messages. The message destination receives a second copy of the message subsequent to expiration of the countdown timer. The message destination sends a request for an indication of the progress of the interaction ID to a corresponding message source that has a clock rate that is synchronized with the clock rate of the message destination. The message destination receives an indication that the interaction has progressed such that a message having the message ID can be discarded. The message destination discards the second copy of the message.

In further embodiments, a message destination receives a first copy of a message that corresponds with a prior instance ID. Subsequently, the message destination processes the first copy of the message at a message processor instance that was initialized to have the prior instance ID. The message destination detects that the contents of memory utilized by the destination computer system were involuntarily lost. The message destination re-initializes the message processor instance to have an updated instance ID differing from the prior instance ID. The message destination receives a second copy of the message subsequent to re-initializing the message processor instance, the second copy of the message corresponding with the prior instance ID. The message destination rejects the second copy of the message since the second copy of the message corresponds to an instance ID that is different than the updated instance ID.

In additional embodiments, a message source sends a first copy of a message that has an interaction ID, a message ID, and a TTL value to a message destination that has a clock rate that is synchronized with the clock rate of the message source. The message source sends a second copy of the message having the interaction ID, the message ID, and an updated TTL value to the destination computer system subsequent to sending the first copy of the message. The updated TTL value calculated from the TTL value specified in the first copy of the message with the elapsed time since the first copy of the message was sent subtracted. The message source detects that the message TTL has expired. The message source updates an interaction cache to indicate that the message no longer requires acknowledgement.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "message source" is defined as the origin of the reliable messaging exchange. The message source can represent both the application which created the message to be delivered reliably and the infrastructure which manages the reliable exchange. In a Simple Object Access Protocol ("SOAP") processing model the source is the initial sender.

In this description and in the following claims, a "message destination" is defined as the target of the reliable messaging exchange. The message destination can represent both the application which consumes the message and the infrastructure which manages the reliable exchange. In a SOAP processing model the destination is the ultimate receiver.

In this description and in the following claims, a message source and message destination have a "synchronized clock rate" when the rate for clock ticks of the message source and the message destination is within a specified upper bound on the permissible drift in the rates.

Drift can be defined in various different ways. When referring to a global universal clock, drift can be defined as:

$$\text{Drift} = |(S2-S1)-(D2-D1)|/(C2-C1),$$

and the upper bound can be defined as:

$$\text{Upper Bound} = \text{Min(One-Way-Latency)}/\text{Max(TTL)}$$

where S1 and D1 are the clock values at source and destination respectively at the instance the universal clock has value C1 and S2 and D2 are the clock values at the source and destination respectively at a subsequent instance the universal clock has value C2. Drift is permissible (i.e., the source and destination clocks can be viewed as having synchronized rates) when Drift<Upper Bound.

The one-way latency is measured from the destination to the source (e.g., as captured by the latency of "REQACK-ACK" message initiated by the destination for an unknown sequence). The TTL is a TTL specified on a message, such as, for example, some multiple of round trip delay. Thus, larger TTLs for a specified message result in more strict requirements on the draft rate of the source and destination clocks. On the other hand, smaller TTLs for a specified message result in less strict requirements on the draft rate of the source and destination clocks.

Without referring to a global universal clock, drift from the source perspective can be defined as:

$$\text{Drift-Source} = (D2-D1)/(2-S1)$$

drift from the destination perspective can be defined as:

$$\text{Drift-Destination} = (S2-S1)/(D2-D1),$$

and the upper bound can be defined as:

$$\text{Upper Bound} = \text{Min(One-Way-Latency)}/\text{Max(TTL)}.$$

The above assumes that both clocks tick forward. That is, S2>S1 and D2>D1. In some cases, for example, when the destination clock ticks faster, it may be that Drift-Source>1 and Drift-Destination<1. Drift is permissible (i.e., the source and destination clocks can be viewed as having synchronized rates) when Drift-Destination<Upper Bound. The one-way latency is measured from the destination to the source. The TTL is a TTL specified on a message, such as, for example, some multiple of round trip delay.

It should be understood that embodiments of the invention do not require that clocks be synchronized to an absolute time.

Messaging Architecture

FIG. 1 illustrates an example of a computer architecture 100 that facilitates reliable messaging using clocks with synchronized rates. As depicted in computer architecture 100 computer systems 102, 103, 103, 106, and 107 are connected to network 101. Network 101 can be a Local Area Network ("LAN"), Wide Area Network ("WAN"), or even the Internet. Computer systems connected to network 101 can receive data from and send data to other computer systems connected in computer architecture 101. Accordingly, computer systems 102, 103, 104, 106, and 107, as well as other connected computer systems (not shown), can exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 101.

Computer systems 102, 103, 104, 106, and 107 include corresponding interaction caches 122, 123, 124, 126, and 127 respectively. Each of the interaction caches 122, 123, 124, 126, and 127 can maintain lists of interaction IDs corresponding to interaction sequences with other computer systems and message IDs of messages that have been processed for each interaction sequence. Each of the interaction caches 122, 123, 124, 126, and 127 can also maintain Time-To-Live ("TTL") values for each message. A TTL value can indicate the duration of time a source attempts to deliver a message to a destination. When a TTL expires at a source, the source can indicate that the message no longer requires acknowledgment (e.g., as a result of a source considering it to have been lost). When a TTL expires at a destination, the destination can subsequently remove a corresponding message ID and/or interaction ID from the interaction cache (thereby freeing up system resources).

Computer systems 102, 103, 104, 106, and 107 include corresponding clocks 112, 113, 114, 116, and 117 respectively. Each of the clocks 112, 113, 114, 116, and 117 can have synchronized rates. That is, the clocks advance in time at essentially the same rate. For example, there can be a common understanding among the clocks 112, 113, 114, 116, and 117 of the definition of seconds, minutes, hours, days, months, years, etc. Thus, even when the absolute times of a plurality of clocks are not synchronized, relative changes in time between the plurality of clocks can be consistent.

Accordingly, when after some period of time, a first clock moves forward a number of minutes there is an extremely high likelihood that a second clock (having a rate synchronized with the first clock) will move forward the same number of minutes. For example, it may be that a first clock has an absolute time of 5:05 PM and a second clock has an absolute time of 5:07 PM. If, after six minutes, the first clock moves forward to 5:11 PM there is an extremely high likelihood that the second clock has moved forward to 5:13 PM.

Further, it should be understood that there can be some drift in the rates of clocks relative to one another and the clocks can still be viewed as clocks with synchronized rates. For example, embodiments of the present invention are particularly advantageous when the drift rate between clocks at communicating computer systems is less than the roundtrip latency between the communication computer systems.

In some embodiments, a destination can forget that it has processed a message (e.g., by removing a message interaction from memory) after the source considers the message to have (A) either been processed or (B) been lost. In practice, event (A) can occur when the destination receives an ACKACK header (from the source) containing the corresponding message ID. In practice, event (B) can occur when a TTL expires.

That is, the destination knows that the source considers a message to be lost if its TTL has expired. In some embodiments, messages are acknowledged after the minimum round trip delay (sending the message followed by the receipt of the acknowledgement). Thus, the TTL can be set to a value larger than the roundtrip delay. In practice, the TTL is set to some multiple of roundtrip delay to support a few retransmissions (or to an infinite value to facilitate exactly-once-delivery).

It may be that computer system 107 includes a server (e.g., a Web server) that receives electronic messages from a large number of clients (e.g., Web browsers) including clients at computer systems 102, 103, 104, and 106. Accordingly, computer system 107 can execute a message process (e.g., message process instance 137) that processes messages received from any of the clients.

Message Source Algorithm

Figure 6:
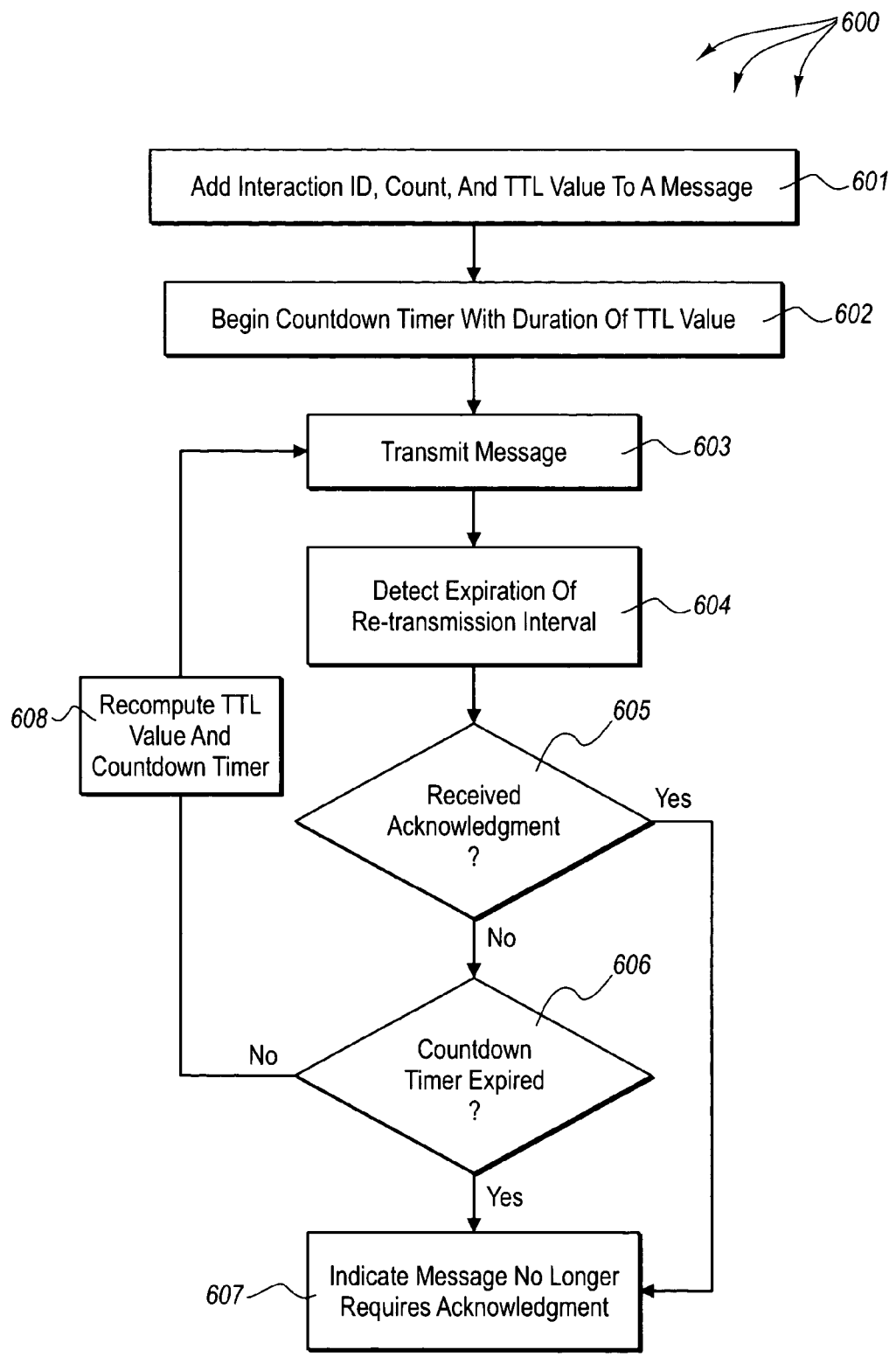
FIG. 6 illustrates an example flow chart of a method for a message source to reliably deliver a message.

Referring now to FIG. 6, FIG. 6 illustrates an example flow chart of a method 600 for a message source to reliably deliver a message. Method 600 includes an act of adding an interaction ID, a sequence number, and a TTL value to a message. For example, computer system 106 can add interaction ID 152, count 153, and TTL value 154 to message 152. Accordingly, a message may be of the format Msg(ID, N, TTL, Data), wherein the data is augmented with tracking information used by a reliable messaging infrastructure.

An ID uniquely identifies an interaction between a message source and a message destination. A message offset number N can be an integer value identifying the offset (e.g., ordinal rank) of a message in an interaction between a message source and a message destination. Together, an interaction ID and message offset number N can uniquely identify a reliable message. A TTL indicates a duration for which a message source will attempt to deliver a message reliably.

The method 600 includes an act of beginning a countdown timer with a duration of the TTL value (act 602). For example, computer system 106 can begin a countdown timer with a duration of TTL value 154. The method 600 includes an act of transmitting the message. For example, computer system 106 (a message source) can transmit message 151 to computer system 107 (a message destination).

It may be that a message source sets a TTL value to a multiple of the roundtrip latency between the message source and the message destination. At a specified interval (e.g., equal to the roundtrip latency), the message source can attempt to re-transmit a message (e.g., message 151). For example, if the round trip latency between computer system 106 and 107 is 10 ms, TTL value 154 can be set to 60 ms. Setting TTL value 154 to 60 ms would allow for at least six re-transmissions (depending on the specified interval).

The method 600 includes an act of detecting expiration of a re-transmisson interval (act 604). For example, computer system 106 can detect expiration of a re-transmission interval corresponding to message 151.

The method 600 includes determining whether or not the message has been acknowledged (decision block 605). When the message has been acknowledged (YES at decision block 605), the method 600 performs act 607. For example, computer system 106 can receive an ACK 161, indicating interaction ID 152 and count 153, from computer system 107. Accordingly, an acknowledgement can be of the form ACK (ID,N), wherein the acknowledgement indicates that message N (or one or more message offset ranges represented by N, such as, for example, (1-6, 10-14, 16)) of the interaction identified by ID arrived at a message destination. When a message source receives an ACK, the message source can update a corresponding interaction cache (e.g., interaction cache 126) to indicate that a message (e.g., message 151) no longer requires acknowledgement.

On the other hand, when the message has been not acknowledged (NO at decision block 605), method 600 performs the decision at decision block 606. Thus, the method 600 can include determining if a countdown timer has expired (decision block 606). For example, computer system 106 can determine if a countdown timer based on TTL value 154 has expired. When the countdown timer has expired (YES at decision block 606), the method 600 performs act 607. On the other hand, when the countdown time has not expired (NO at decision block 606), the method 600 performs act 608.

The method 600 includes an act of recomputing the TTL value and countdown timer (act 608). For example, computer system 106 can recompute a TTL value and countdown timer for message 151 after detection of a re-transmission interval. Thus, if an original TTL value was 60 ms and a re-transmission interval was 10 ms, a new TTL value can be set to 50 ms before retransmitting message 151.

The method 600 includes an act of indicating that the message no longer requires acknowledgement (act 607). For example, computer system 106 can update interaction cached 126 to indicate that message 151 no longer required acknowledgment. Thus, computer system 106 terminates any retransmissions of message 151 either after receiving an acknowledgment from computer system 107 is received or when a countdown timer expires.

From time to time or in response to a request from a message destination, a message source can send an Acknowledgment-Acknowledgment to indicate to the message destination that the message source no longer requires acknowledgment of a message. For example, computer system 106 can send ACKACK 171, including interaction ID 152 and count 153, to computer system 107. Accordingly, an acknowledgement-acknowledgement can be of the form ACKACK(ID, N), wherein the acknowledgement acknowledgment indicates that the message source does not require acknowledgment of message N (or one or more message offset ranges represented by N, such as, for example, (1-3, 5, 8-12)) for the interaction identified by ID. An ACKACK can also include an instance ID that identifies a message processor instance at a message destination. For example, ACKACK 171 includes instance ID 172 that corresponds to the last instance of message process instance 137 that computer system 106 was aware of.

Figure 7:
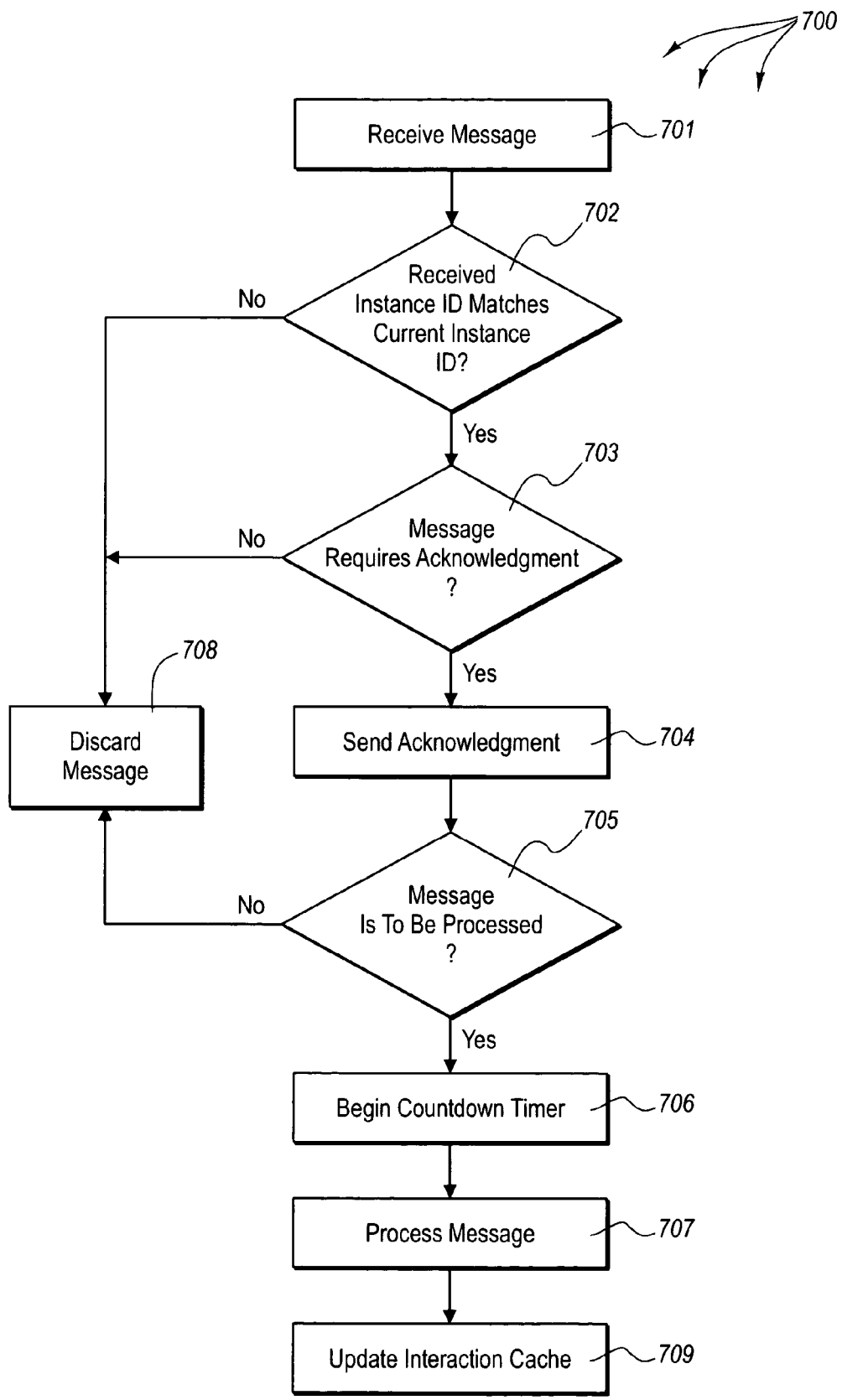
FIG. 7 illustrates an example flow chart of a method for a message destination to reliably process a message.

A request from a message destination can be a Request Acknowledgment Acknowledgment message (not shown in FIG. 1) that indicates the message destination needs the progress of an interaction. Accordingly, an request acknowledgement-acknowledgement can be of the form REQACK-ACK(ID), wherein the request acknowledgement-acknowledgment indicates that the message destination needs the progress of the interaction identified by ID before proceeding. Periodically and upon receipt of a REQACKACK(ID), a source can send an ACKACK(ID, N) to a destination Message Destination Algorithm Referring now to FIG. 7, FIG. 7 illustrates an example flow chart of a method 700 for a destination to reliably deliver a message. Method 700 includes an act of receiving a message. For example, computer system 107 can receive message 151 (act 701). Method 700 includes determining if the received instance ID, if present, matches the current instance ID. For example, computer system 107 can determine if instance ID 172 matches the current instance ID of message process instance 137. Computer system 106 can optionally include instance ID 172 in message 151 (not shown). However, computer system 106 can be required to include it in the ACK- ACK message it sends in response to a REQACKACK. For example, after receiving message 151, computer system 107 can send a REQACKACK(Interaction ID 152) to computer system 106. Computer system 106 can respond with an ACK-ACK(Interaction ID 152, a message offset number (which may differ from count 153), Instance ID 172).

When the received instance ID does not match the current instance ID (NO at decision block 702), method 700 performs act 708. On the other hand, when the received instance ID does match the current instance ID (YES at decision block 702), method 700 performs the decision at decision block 703.

Method 700 includes determining if the message requires acknowledgment (decision block 703). For example, computer system 107 can determine if message 151 requires acknowledgment. Computer system 107 can check interaction cache 127 to determine if an ACKACK was previously received for message 151. If an ACKACK was previously received, message 151 no longer required acknowledgement. It may be that the interaction cache 127 does not include the interaction identified by interaction ID 151. Thus, computer system 107 can send a REQACKACK(Interaction ID 151) to computer system 106. In response, computer system can receive a corresponding ACKACK from computer system 106. Computer system 107 can update interaction cache 127 with the progress information (e.g., message offset number and instance ID) in the ACKACK Method 700 includes an act of sending an acknowledgement (act 704). For example, computer system 107 can send ACK 161, including interaction ID 152 and count 153, to computer system 106 to acknowledge receipt of message 151.

Method 700 also includes determining if the message is to be processed. For example, computer system 107 can also determine if message 151 is to be processed. When the message is not to be processed (NO at decision block 705), method 700 performs act 708. On the other hand, when the message is to be processed (YES at decision block 705), method 700 performs act 706.

Method 700 includes an act of beginning a countdown timer (act 706). For example, upon receiving message 151, computer system 107 can begin a countdown timer based on TTL value 154. Computer system 107 must maintain interaction ID 152 and count 153 until the timer expires or a corresponding ACKACK is received. Method 700 includes an act of processing the message (act 707). For example, computer system 107 can deliver message 151 to message process instance 137 that in turn processes the message.

Method 700 includes an act of updating the interaction cache (act 709). For example, computer system 107 can update interaction cache 127. An interaction cached can be updated subsequent to receiveing an ACKACK (e.g., ACK-ACK 171) or subsequent to expiration of a countdown timer (e.g., based on TTL value 154). Thus, computer system 107 can periodically flush interaction cache 127 of interactions whose countdown timers have expired and whose interaction IDs have been idle for a specified period of time.

Method 700 includes an act of discarding a message (act 708). For example, computer system 107 may discard message 151. A message can be discarded when instance IDs do not match, an ACKACK was previously received for a message, the message was previously processed, or a countdown timer has expired for a message.

Message Source and Message Destination Interoperation

The method 600 (message source perspective) and method 700 (message destination perspective) can interoperate to provide reliable messaging. In some embodiments, various pre-conditions are established before processing an initial sequence message. For example, a message source receives an endpoint reference that uniquely identifies the message destination endpoint instance (e.g., message process instance 137) and correlations across messages addressed to the message destination endpoint instance are meaningful. A destination can reset an instance ID (e.g., a stateless boot time) each time a message destination endpoint instance is initialized. Further, a message source can have knowledge of the message destination's policies (if they exist) and can formulate message that adhere to any policies (e.g., facilitated by WS-Metadata Exchange). Additionally, when a secure message exchange is required, a message source and a message destination can establish a secure context (e.g., facilitated by WS-SecureConversation).

Other mechanisms for securing reliable messaging sequence information are also possible, even when a destination periodically removes reliable messaging sequence information from memory. For example, a message destination can encrypt a session key (or shared key) with a private key (e.g., of a public/private key pair) and send the encrypted session key (e.g., in a token) to a message source. The message source receives the token and can retain the token for later use. The message source can also decrypt the encrypted session key using the corresponding public key (of a public/private key pair) to reveal the unencrypted session key. Subsequent messages included in the interaction can be secured using the session key.

From time to time, a message destination may receive a message for an interaction the message destination has forgotten (i.e., the interaction ID, etc., have been removed from a corresponding interaction cache). In response, the message destination can send an REQACKACK to the message source requesting tracking information for the interaction. In response to the REQACKACK (and potentially included in an ACKACK), the message source can send a previously received token for the interaction to the message destination. The message destination can decrypt the token (it knows it's own public/private key pair) to reveal the unencrypted session or shared key corresponding to the interaction. Subsequent messages included in the interaction can be secured using the session key.

When a message source can not provide a token (and thus can not provide a corresponding session or shared key) for an interaction, the message destination starts a new interaction with new interaction ID and a message ID of 1. The message destination can then send a new token to the message source to establish a new security context for the new interaction. Accordingly, embodiments of the present invention can be used to reduce the likelihood of, and potentially prevent, a reliable messaging session from being hijacked.

Further, various protocol invariants may also be established to insure reliable messaging. For example, a message source can initialize the message offset number (N) at 1 and increase the message offset number by 1 for each subsequent message in an interaction. Further, an Acknowledgment can include a range or ranges of sequence numbers of every message either successfully received by a message destination or specified in an ACKACK and exclude message offset numbers for messages not yet received. Additionally, ACK-ACKs issued from a message source can include an acknowledgement range or ranges of message offset numbers of every message for which an ACK was received or whose TTL expired. When a TTL expires, the destination knows that the source considers a message (or ranges of messages) to be lost. Accordingly, the destination can close acknowledgment a message range for that message (or range or messages).

Accordingly, at-most-once delivery to a message processing instance is insured when a multiple copies of message are received under a variety of different conditions. For example, at-most-once delivery is insured when a message ID and corresponding specified interaction are maintained in an interaction cache at a message destination (before or after a TTL has expired), when an message ID (and possibly a corresponding specified interaction) has been flushed from an interaction cache at a message destination, and when a message destination suffers an involuntary memory loss.

When a message is received at a message destination, the message destination determines if the received message includes an instance ID. If the received message does not include an instance ID and the interaction ID specified by the message is not present in the interaction cache, the message destination sends a REQACKACK to the message source. The message source responds with an ACKACK that (based on the established protocol invariants) includes an instance ID. The received instance ID (whether included in a message or an ACKACK) is an instance ID that was indicated to the message source as the current instance ID for a corresponding message processor instance at some prior time (based on established pre-conditions). The message destination compares the received instance ID to the current instance ID of the corresponding message processor. When the received instance ID and the current instance ID do not match (potentially indicating that the message destination suffered an involuntary memory loss during a specified interaction), the message is rejected and the specified interaction is failed.

On the other hand, when the received instance ID and the current instance ID do match (and thus the message destination has maintained an interaction cache during the specified interaction), other tracking information from the received message is checked. The message destination checks a corresponding interaction cache to determine if the message ID and the interaction ID of the received message were previously processed. Since a message destination may flush the corresponding interaction cache periodically (but not necessarily immediately after a TTL value expires), an interaction cache can maintain (at least for some amount of time) tracking information even for expired messages. Thus, the corresponding interaction cache can indicate that a message was previously processed as a result of received message being delivered to the message processor instance. When the corresponding interaction cached indicates that the received message was previously processed, the received message is discarded.

However, it may be that the corresponding interaction cache does not include tracking information for the message. When the corresponding interaction cache does not include tracking information, the message destination sends a REQACKACK to the message source. For example, it may be that the received message was previously processed by the destination. If tracking information is not present in the destination interaction cache (A for the interaction ID specified by the received message, the countdown timer must have expired for all the messages that are part of the specified interaction at the message destination. Otherwise, the destination message processor would not have flushed the specified interaction from its interaction cache. This implies that that the message's countdown timer must have also expired at the message source, since the message source will start the count down timer before transmitting the message and the message source and message destination have synchronized clock rates.

At the message source, either by receiving a prior ACK or by the countdown timer expiring, the message source indicates (in a returned ACKACK) that acknowledgement of the message is no longer required (even if the message was last sent before the countdown timer expired). The message destination receives the ACKACK and compares tracking information from the ACKACK to tracking information included in the message. Since the ACKACK indicates that acknowledgement of the message is not needed, the message destination discards the message.

Figure 2:
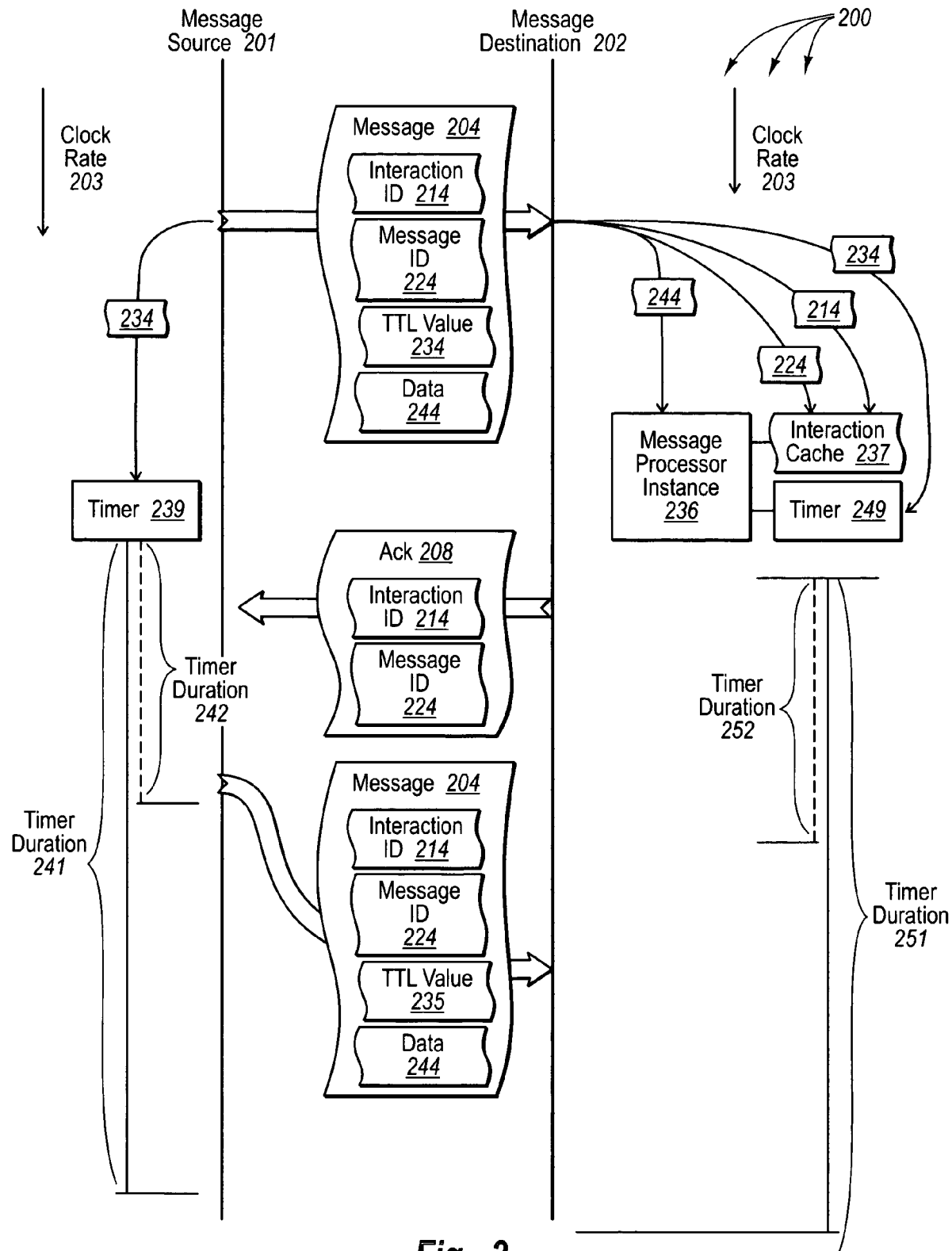
FIG. 2 illustrates a first example message flow that facilitates reliably processing a messaging when a message ID is maintained in an interaction cache at a message destination.

FIG. 2 illustrates a first example message flow 200 that facilitates reliably messaging when a message ID is maintained in an interaction cache at a message destination. The message flow 200 insures at-most-once delivery when a second copy of a message is received before a TTL has expired.

As depicted in message flow 200, source 201 and destination 202 exchange electronic messages. It may be that source 201 is one of computer systems 102, 103, 104, and 106 and that destination 202 is computer system 107. Source 201 and destination 202 have clocks that move forward at synchronized clock rate 203. Thus, there is an extremely high likelihood that relative changes in time values at source 201 and destination 202 are to be consistent. For example, if after some period of time a clock at source 201 has moved forward 10 minutes and 12 seconds, there is an extremely high likelihood that a corresponding clock at destination 202 has also moved forward 10 minutes and 12 seconds after the same period of time.

Message flow 200 includes an act of message source 201 (e.g., a Web browser) sending message 204. Message 204 includes interaction ID 214, message ID 224, Time-To-Live ("TTL") value 234, and data 244. Interaction ID 214 identifies message 204 as corresponding to a specified interaction between message source 201 message destination 202. Message ID 224 identifies the position of the message 204 in a sequence of messages that are exchanged as part of the specified interaction (corresponding to Interaction ID 214). Data 244 is a portion of data (e.g., application data) that is to be transferred to a module (e.g., message processor instance 236) at destination 202. TTL value 234 indicates the length of time the source 201 will attempt to deliver message 204.

Based on TTL value 234 message source 201 can set timer 239 of timer duration 241.

Message destination 202 (e.g., a Web server) can receive message 204. Upon receiving message 204, message destination 202 can deliver data 244 to message processor instance 236 that in turn processes data 244. Interaction cache 237 can be updated to indicate that message 204 has been processed. For example, interaction cache 237 can be updated to indicate that a message having message ID 224 was processed for an interaction identified by interaction ID 214. Based on TTL value 234, timer 249 can set timer duration 251. Timer duration 251 expires sometime after timer duration 241 (e.g., at least by the message latency of message 204).

Message destination 202 can send ACK message 208, including interaction ID 214 and message ID 224, to indicate that message 204 was processed. However, message source 201 may not receive ACK message 208 (e.g., due to communication errors on a network that connects message source 201 and message destination 202). Thus, when a re-transmission interval expires, message source 201 may transmit an additional copy message 204 to message destination 202. As indicated by TTL value 235, message source 201 can recompute the TTL value for message 204 as the remaining time to expiration of timer 239.

Message destination 202 can receive the additional copy of the message 204 subsequent to processing the earlier copy message 204. Message destination 202 can identify the additional copy of the message from the interaction ID 214 and message ID 224. Message destination 202 can check interaction cache 237 and determine that a message having message ID 224 and corresponding to the specified interaction identified by interaction ID 214 (i.e., message 204) was previously processed. Accordingly, message destination 202 can discard the additional copy of message 204 based on interaction cache 237 indicating that a message having the message ID 224 was previously processed.

The message flow 200 can also insure at-most-once delivery when a second copy of a message is received after a TTL has expired. For example, TTL value 234 can alternately cause timer 239 to set timer duration 242 and cause timer 249 to set timer duration 252. Timer duration 252 expires sometime after timer duration 242 (e.g., at least by the message latency of message 204).

Thus, as depicted in FIG. 2, message destination 202 can receive the additional copy of message 204 after timer duration 252 has expired. However, message destination 202 may wait some amount of time before flushing interaction ID 214 and message ID 224 from memory. Thus, when the additional copy of message 204 is received, interaction cache 237 still includes interaction ID 214 and message ID 224, even though message duration 252 has expired. Thus, message destination 202 can reject the additional copy of message 204 based on interaction cache 237 indicating that a message having the message ID 224 was previously processed. Accordingly, at-once-most delivery is insured when an interaction cached maintains a message ID.

Figure 3:
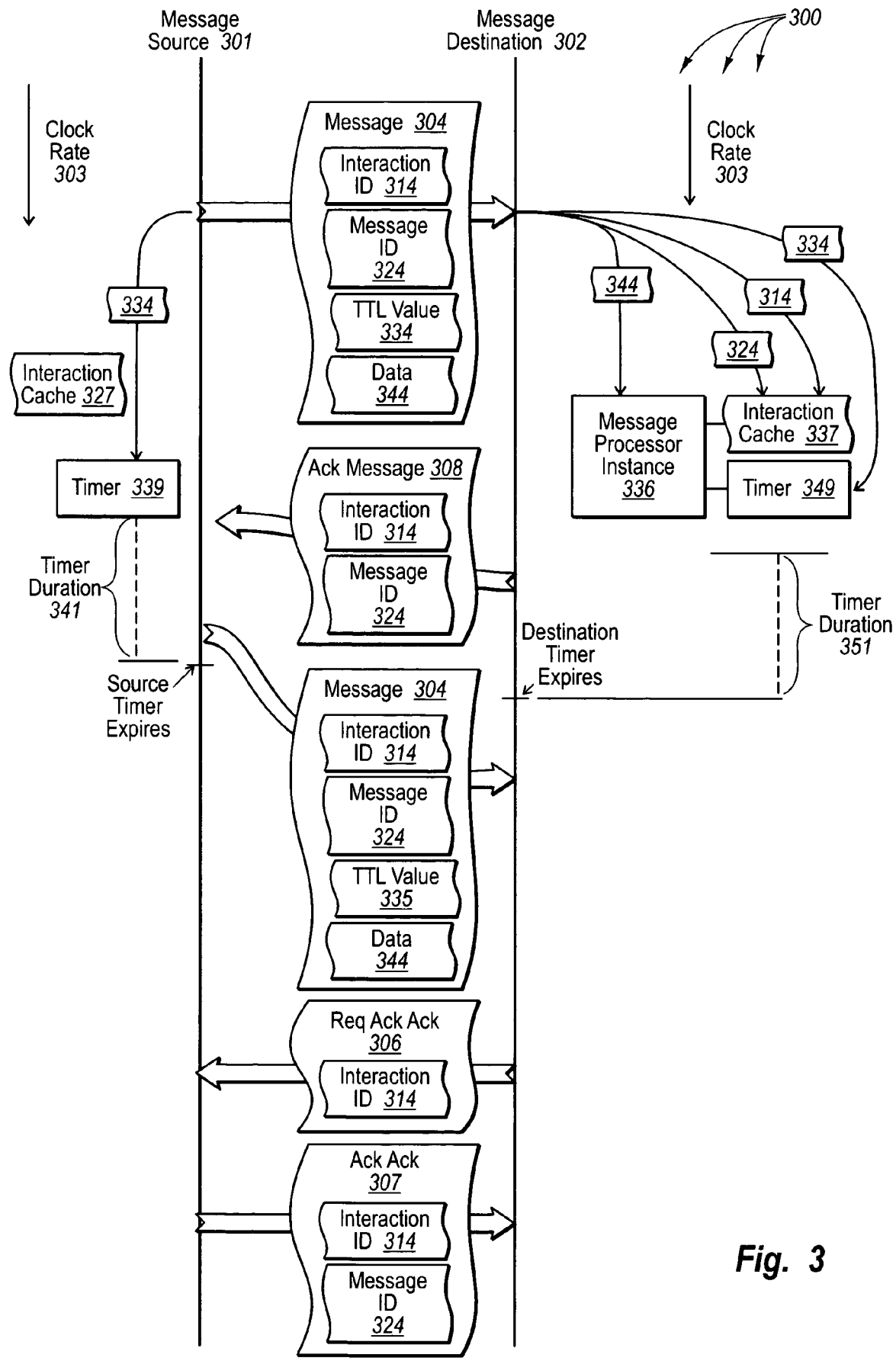
FIG. 3 illustrates a second example message flow that facilitates reliably processing a message when a message ID has been flushed from an interaction cache at a message destination.

FIG. 3 illustrates a second example message flow that facilitates reliably processing a message when a message ID has been flushed from an interaction cache at a message destination. The message flow 300 insures at-most-once delivery when a second copy of a message is received after a corresponding message offset has been flushed from memory.

As depicted in message flow 300, message source 301 and message destination 302 exchange electronic messages. It may be that source 301 is one of computer systems 102, 103, 104, and 106 and that message destination 302 is computer system 107. Message source 301 and message destination 302 can have clocks that move forward at synchronized clock rate 303. Thus, there is an extremely high likelihood that relative changes in time values at message source 301 and message destination 302 are consistent. For example, if after some period of time a clock at message source 301 has moved forward 8 minutes and 24 seconds, there is an extremely high likelihood that a corresponding clock at message destination 302 has also moved forward 8 minutes and 24 seconds after the same period of time.

Message source 301 (e.g., a Web browser) sends message 304. Message 304 includes interaction ID 314, message ID 324, Time-To-Live ("TTL") value 334, and data 344. Interaction ID 314 identifies message 304 as corresponding to a specified interaction with message destination 302. Message ID 324 identifies the message sequence position of message 304 in a sequence of messages that are exchanged as part of the specified interaction (corresponding to Interaction ID 314). Data 344 is a portion of data (e.g., application data) that is to be transferred to a module at message destination 302 (e.g., to message processor instance 336). TTL value 334 indicates the length of time the message source 301 will attempt to deliver message 304.

Based on TTL value 334 message source 301 can set timer 339 of timer duration 341.

Message destination 302 (e.g., a Web server) can receive message 304. Upon receiving message 304, message destination 302 can deliver data 344 to message processor instance 336 that in turn processes data 344. Interaction cache 337 can be updated to indicate that message 304 has been processed. For example, interaction cache 337 can be updated to indicate that a message having message ID 324 was processed for an interaction identified by interaction ID 314. Based on TTL value 334, timer 349 can set timer duration 351. Timer duration 351 expires sometime after timer duration 341 (e.g., at least by the message latency of message 304).

Message destination 302 can send ACK message 308, including interaction ID 314 and message ID 324, to indicate that message 304 was processed. However, message source 301 may not receive ACK Message 308 (e.g., due to communication errors on a network that connects message source 301 and message destination 302). Thus, when a re-transmission interval expires, message source 301 may transmit an additional copy of message 304 to message destination 302. Message destination 302 receives the additional copy of message 304 from message source 301. As indicated by TTL value 335, message source 301 can recompute the TTL value for message 304 as the remaining time to expiration of timer 339.

Subsequent to expiration of timer duration 351, message ID 324 (and possibly also interaction ID 314) is removed (flushed) from interaction cache 337. As depicted in message flow 300, the additional copy of message 304 is sent from message source 301 before timer duration 341 expires and is received at message destination 302 after timer duration 351 expires. Message destination 302 also receives the additional copy of message 304 subsequent to message ID 324 (and possibly interaction ID 314) having been removed from inter-action cache 337. Thus, when the additional copy of message destination 302 is received, interaction cache 337 does not include tracking information for message 304.

Accordingly, message destination 302 can send REQACK-ACK 306, including interaction ID 314, to message source 301. REQACKACK 306 is a request for an indication of the progress of the interaction identified by interaction ID 314. Further, sometime after the additional copy of message 304 is sent, the timer duration (341 or equivalent) expires and message source 301 updates interaction cache 327 to indicate that message 104 no longer requires acknowledgement. For example, interaction cache 327 can be updated to indicate that a message having message ID 324 no longer requires acknowledgment for an interaction identified by interaction ID 314. Thus, in response to REQACKACK 306, message source 301 sends ACKACK 307, including interaction ID 314 and message offset 324, to message destination 302. ACK-ACK 307 indicates that the interaction identified by interaction ID 324 has progressed such that a message having message ID 324 can be discarded (i.e., does not require acknowledgement). Thus, message destination 302 discards the additional copy of message 304.

Generally, message destination 302 is configured to remove tracking information related to an interaction from memory (i.e., forget the tracking information) without terminating participation the interaction. When message destination 302 receives a message corresponding to an interaction that is not included in interaction cache 337, message destination 302 sends a REQACKACK to the appropriate message source (e.g., message source 301). The message source responds by returning a corresponding ACKACK, including the relevant tracking information for the interaction, to message destination 302. Thus, the appropriate message source can update message destination with the appropriate tracking information. Accordingly, at-most-once delivery is insured even when an interaction cached has been flushed.

Figure 4:
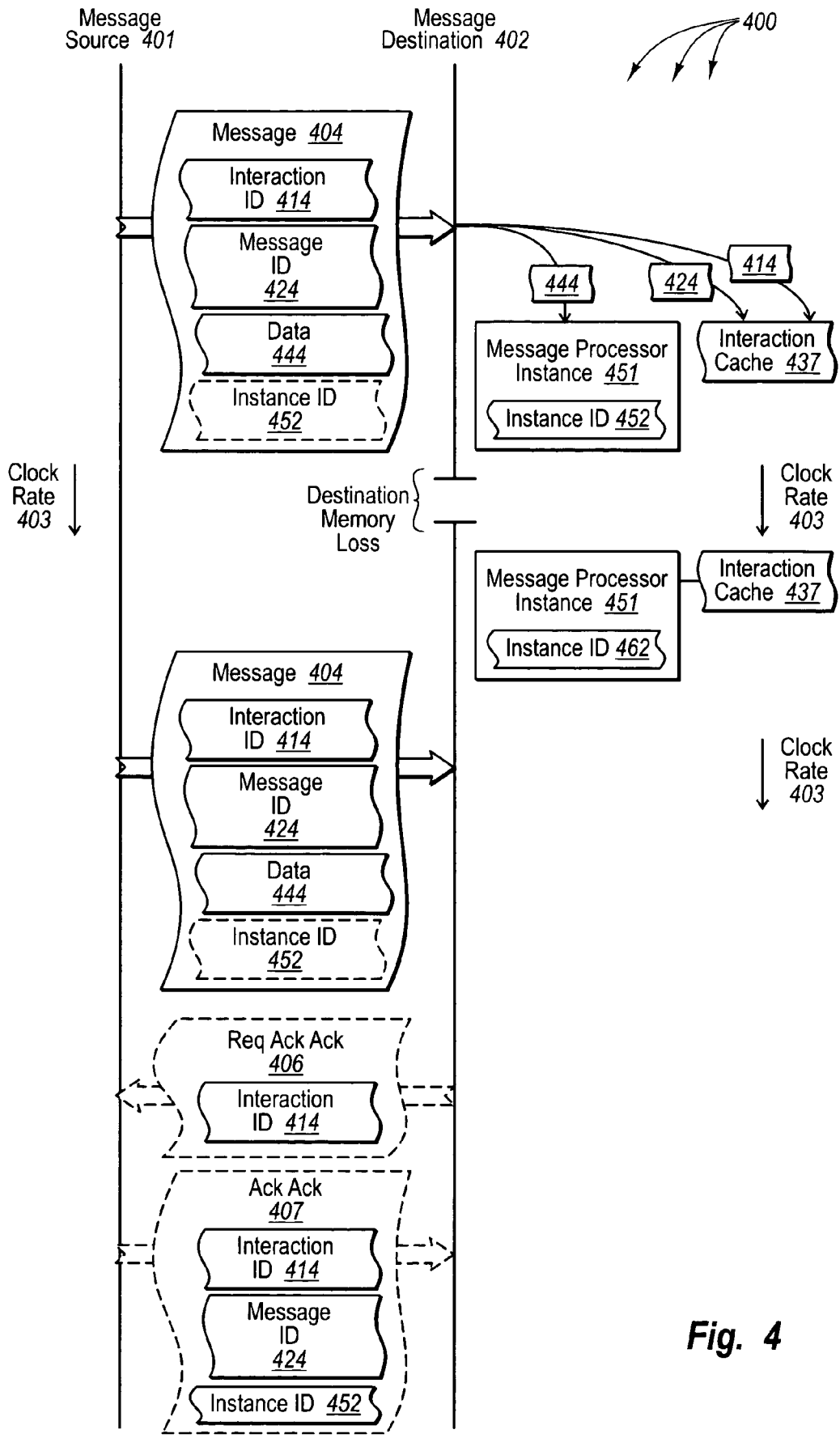
FIG. 4 illustrates a third example message flow that facilitates reliably processing a message when a message destination suffers an involuntary memory loss.

FIG. 4 illustrates a third example message flow 400 that facilitates reliably processing a message when a message destination suffers an involuntary memory loss. The message flow 400 insures at-most-once delivery when a second copy of a message is received after an involuntary memory loss.

As depicted in message flow 400, message source 401 and message destination 402 exchange electronic messages. It may be that message source 401 is one of computer systems 102, 103, 104, and 106 and that message destination 402 is computer system 107. Source 401 and destination 402 can have clocks that move forward at synchronized clock rate 403. Thus, there is an extremely high likelihood that relative changes in time values at message source 401 and message destination 402 are consistent. For example, if after some period of time a clock at message source 401 has moved forward 8 minutes and 24 seconds, there is an extremely high likelihood that a corresponding clock at message destination 402 has also moved forward 8 minutes and 24 seconds after the same period of time.

Message source 401 (e.g., a Web browser) sends message 404. Message 404 includes interaction ID 414, message ID 424, data 444, and optionally includes (as indicated by the dashed line) instance ID 452. Interaction ID 414 identifies message 404 as corresponding to a specified interaction with message destination 402. Message ID 424 identifies the message sequence position of message 404 in a sequence of messages that are exchanged as part of the specified interaction (corresponding to Interaction ID 314). Data 344 is a portion of data (e.g., application data) that is to be transferred to a module at message destination 402 (e.g., to message processor instance 451). Instance ID 452 is an instance ID that was indicated to the message source as the current instance ID message processor instance 451 at some prior time (based on established pre-conditions).

Message destination 402 (e.g., a Web server) receives message 404 that corresponds to instance ID 452. Upon detecting that the instance ID in message 404 matches the current instance ID of message process instance 451 (i.e., instance ID 452), message destination 402 performs other checks on tracking information. When appropriate, message destination 402 delivers data 444 to message processor instance 451 that in turn processes data 444. Interaction cache 437 can be updated to indicate that message 404 has been processed. For example, interaction cache 437 can be updated to indicate that a message having message ID 424 was processed for an interaction identified by interaction ID 414.

Subsequent to processing message 404, message destination 402 can suffer an involuntary memory loss (including the contents of interaction cache 437). Thus, message destination 402 detects (e.g., during a re-boot sequence) that the contents of memory utilized by message destination 402 were involuntarily lost. Accordingly, message destination 402 can re-initializing message processor instance 451 to have an updated instance ID 462 that differs from the prior instance ID 452.

Since message source 401 did not receive an acknowledgement of message 404, message source 401 can attempt to re-transmit an additional copy of message 404 (e.g., when a re-transmission interval expires). Message destination 402 can receive the additional copy of message 404 subsequent to re-initializing the message processor. As depicted, the additional copy of message 404 optionally includes instance ID 452. Message destination 402 compares the instance ID included in the additional copy of message 404 (instance ID 452) to the current instance ID of message processor instance 451 (instance ID 462). Message destination 402 rejects the message (and the interaction corresponding to interaction ID 414 is to be failed) since the additional copy of message 404 corresponds to instance ID 451 instead of instance ID 462.

When an instance ID is not included in message 404, message destination 402 can optionally send REQACKACK 406 to request the progress of the interaction corresponding to interaction ID 414. Message source 401 can respond with ACKACK 407 that includes interaction ID 414, message ID 424, and instance ID 452. From ACKACK 407, message destination 402 can determine that the additional copy of message 404 is to be rejected (and the interaction corresponding interaction ID 414 is to be failed). Further, REQACKACK 406 can optionally include instance ID 462. Thus, message source 401 can learn the instance ID of message processor instance 451 at the start of a new interaction. That is, when a REQACKACK contains the destination instance ID, the source can detect that the destination has rebooted. Accordingly, at-most-once delivery is insured when a destination suffers an involuntary memory loss.

Generally, it should be understood that a plurality of message offset IDs can be included in acknowledgments (ACK and ACKACK). For example, an acknowledgement can include a range of message offsets (e.g., 19-23) in an interaction, a list of messages offsets (e.g., 1, 4, 17) in an interaction, or a combination of ranges and lists of message offsets (e.g., 3, 7, 14-19, 22, 24-26) in an interaction. It also should be understood that ACK and REQACKACK can be defined as message headers (such as with SOAP processing model) so that they can be attached to any message flowing from the destination to the source. Similarly, ACKACK can be defined as message header so that it can be attached to any message flowing from the message source to the destination.

Further, since an ACKACK message indicates to a message destination the messages that do not require acknowledgment (either because a corresponding ACK was received or because the messages timed out), ACKACK messages can be used eliminate holes between acknowledgement ranges. That is, use of an ACKACK message can cause a message destination to coalesce acknowledgement ranges and lists into a single range. For example, a message source may receive ACK message acknowledging messages IDs in ranges 1-10, 13-15, and 17-20. Subsequently, message IDs 11 and 12 can expire at the message source. Thus, in response to a REQACKACK received after expiration of message IDs 11 and 12, a sent ACKACK can indicate that message IDs 1-15 and 17-20 no longer require acknowledgment. Thus, ACK-ACK's can bound the size of acknowledgements such that the size of acknowledgments is prevented from continuously growing for long standing interactions.

Embodiments of the present invention can also be used for exactly-once-delivery, for example, when TTL values are infinite and instance IDs are not used.

Further, it should be understood that message flows 200, 300, and 400 can be implemented across a network between at a plurality of computer systems at any given time. For example, each of the computer systems 102, 103, 104, and 106 (as well as other computer systems connected to network 101) can exchange messages (potentially simultaneously) as part implementing message flows 200, 300, and 400 with computer system 107. Each of the computer systems 102, 103, 104, and 106 (as well as other computer systems connected to network 101) can implement message flow 200, 300, 400 at the same time or at different times as appropriate. Additionally, each of the computer systems 102, 103, 104, and 106 (as well as other computer systems connected to network 101) can implement a plurality of message flows 200, 300, 400 with computer system 107. It may be that each instance of message flow 200, 300, and 400 corresponds to a different interaction ID.

Figure 5:
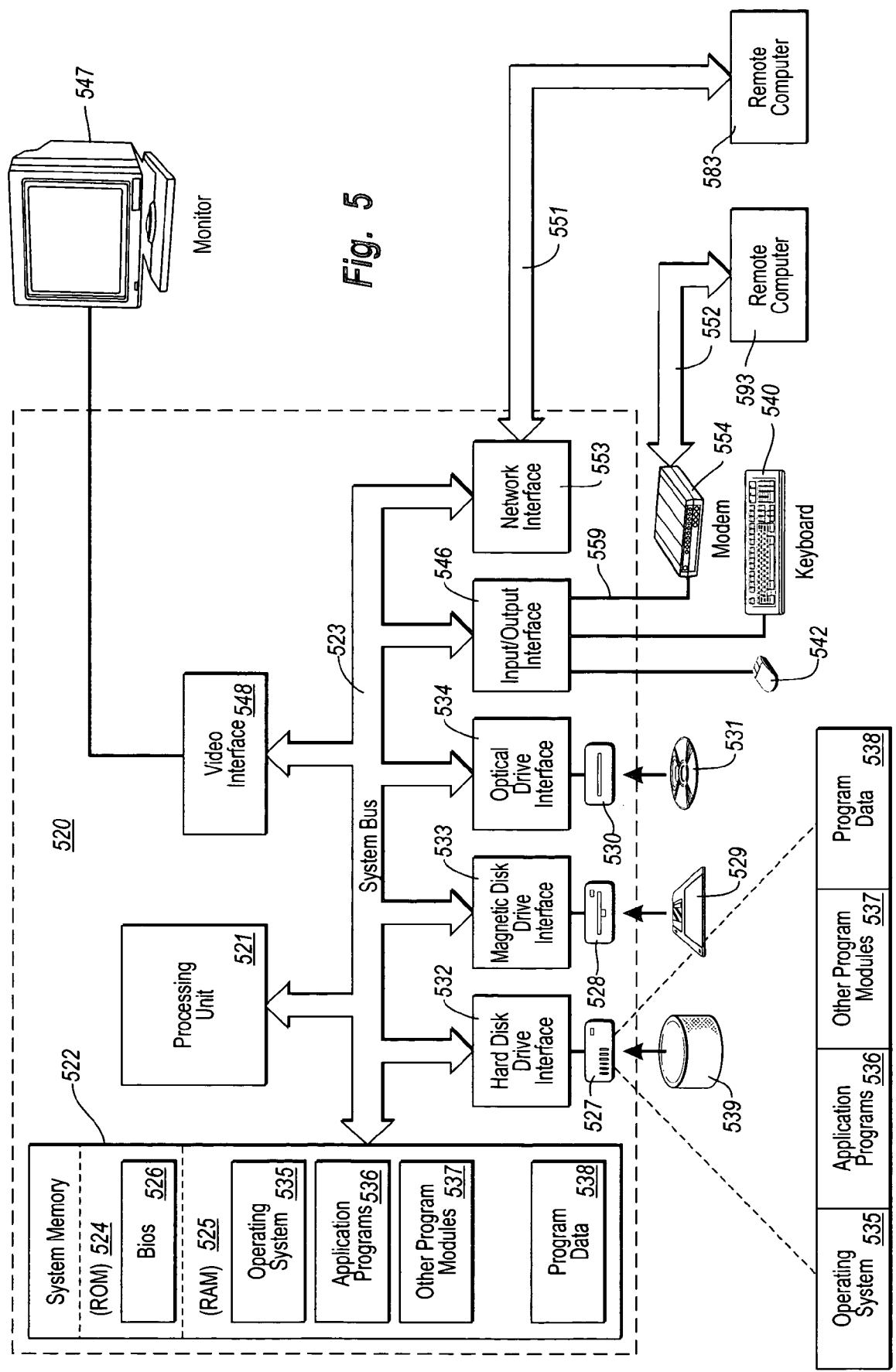
FIG. 5 illustrates a suitable operating environment for the principles of the present invention.

FIG. 5 illustrates a suitable operating environment for the principles of the present invention. FIG. 5 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 5, an example system for implementing the invention includes a general-purpose computing device in the form of computer system 520, including a processing unit 521, a system memory 522, and a system bus 523 that couples various system components including the system memory 522 to the processing unit 521. Processing unit 521 can execute computer-executable instructions designed to implement features of computer system 520, including features of the present invention. The system bus 523 may be any of several types of bus structures including a memory bus or memory controller, a peripheral bus, and a local bus using any of a variety of bus architectures. The system memory includes read only memory ("ROM") 524 and random access memory ("RAM") 525. A basic input/output system ("BIOS") 526, containing the basic routines that help transfer information between elements within computer system 520, such as during start-up, may be stored in ROM 524.

The computer system 520 may also include magnetic hard disk drive 527 for reading from and writing to magnetic hard disk 539, magnetic disk drive 528 for reading from or writing to removable magnetic disk 529, and optical disk drive 530 for reading from or writing to removable optical disk 531, such as, or example, a CD-ROM or other optical media. The magnetic hard disk drive 527, magnetic disk drive 528, and optical disk drive 530 are connected to the system bus 523 by hard disk drive interface 532, magnetic disk drive-interface 533, and optical drive interface 534, respectively. The drives and their associated computer-readable media provide non-volatile storage of computer-executable instructions, data structures, program modules, and other data for the computer system 520. Although the example environment described herein employs magnetic hard disk 539, removable magnetic disk 529 and removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 539, magnetic disk 529, optical disk 531, ROM 524 or RAM 525, including an operating system 535, one or more application programs 536, other program modules 537, and program data 538. A user may enter commands and information into computer system 520 through keyboard 540, pointing device 542, or other input devices (not shown), such as, for example, a microphone, joy stick, game pad, scanner, or the like. These and other input devices can be connected to the processing unit 521 through input/output interface 546 coupled to system bus 523. Input/output interface 546 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 547 or other display device is also connected to system bus 523 via video interface 548. Other peripheral output devices (not shown), such as, for example, speakers and printers, can also be connected to computer system 420.

Computer system 520 is connectable to networks, such as, for example, an office-wide or enterprise-wide computer network, a home network, an intranet, and/or the Internet. Computer system 520 can exchange data with external sources, such as, for example, remote computer systems, remote applications, and/or remote databases over such networks.

Computer system 520 includes network interface 553, through which computer system 520 receives data from external sources and/or transmits data to external sources. As depicted in FIG. 5, network interface 553 facilitates the exchange of data with remote computer system 583 via link 551. Network interface 553 can logically represent one or more software and/or hardware modules, such as, for example, a network interface card and corresponding Network Driver Interface Specification ("NDIS") stack. Link 551 represents a portion of a network (e.g., an Ethernet segment), and remote computer system 583 represents a node of the network.

Likewise, computer system 520 includes input/output interface 546, through which computer system 520 receives data from external sources and/or transmits data to external sources. Input/output interface 546 is coupled to modem 554 (e.g., a standard modem, a cable modem, or digital subscriber line ("DSL") modem) via link 559, through which computer system 520 receives data from and/or transmits data to external sources. As depicted in FIG. 5, input/output interface 546 and modem 554 facilitate the exchange of data with remote computer system 593 via link 552. Link 552 represents a portion of a network and remote computer system 493 represents a node of the network.

While FIG. 5 represents a suitable operating environment for the present invention, the principles of the present invention may be employed in any system that is capable of, with suitable modification if necessary, implementing the principles of the present invention. The environment illustrated in FIG. 5 is illustrative only and by no means represents even a small portion of the wide variety of environments in which the principles of the present invention may be implemented.

In accordance with the present invention, modules including message processor instances and clocks as well as associated data, including interaction IDs, message IDs, TTL values, instance IDs, counts, data, and interaction caches may be stored and accessed from any of the computer-readable media associated with computer system 520. For example, portions of such modules and portions of associated program data may be included in operating system 535, application programs 536, program modules 537 and/or program data 538, for storage in system memory 522.

When a mass storage device, such as, for example, magnetic hard disk 539, is coupled to computer system 520, such modules and associated program data may also be stored in the mass storage device. In a networked environment, program modules depicted relative to computer system 520, or portions thereof, can be stored in remote memory storage devices, such as, system memory and/or mass storage devices associated with remote computer system 583 and/or remote computer system 593. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a destination computer system that is network connectable along with one or more other computer systems, including a source computer system, to a network, the destination computer system and at least the source computer system having synchronized clock rates, the synchronized clock rates between the source computer system and the destination computing system causing the source computer system and the destination computer system to perceive the movement of time at virtually the same rate, a method for reliably processing a message, the method comprising:

an act of receiving a first copy of a message from the source computer system, the first copy of the message having a message ID and a TTL value, the message ID identifying the position of the message in an interaction between a message source and the destination computer system, the TTL value indicating the length of time before a source side countdown timer, set prior to sending the first copy of the message, expires, expiration of the source side countdown time indicating when the source computer system is to terminate retransmissions of the message, the TTL value set to a plurality of the roundtrip latency between the source computer system and the destination computer system, the TTL value set to support a corresponding plurality of retransmissions of the message;

an act of setting a destination side countdown timer to expire at the destination computer system after the length of time indicated in the TTL value, the destination computer system configured to retain the message ID until the countdown timer expires or a corresponding ACKACK is received, the destination computer system knows from expiration of the destination side countdown timer that the source computer system all ready considers the message to be lost based on the source computer system and the destination computer system having synchronized clock rates;

an act of detecting expiration of the countdown timer;

in response to detecting expiration of the countdown timer:

an act of determining that retransmission of the message has already been terminated at the sending computer system due to prior expiration of the sending side countdown timer and based on the computer system and the destination computer system having synchronized clock rates; and an act of updating an interaction cache to indicate that the message has been processed;

an act of receiving a second copy of the message subsequent to processing the first copy of the message, the second copy of the message having the message ID; and an act of discarding the second copy of the message based on the interaction cache indicating that a message having the message ID was previously processed.

2. The method as recited in claim 1, wherein an act of receiving a first copy of a message comprises an act of receiving a first copy of the message that includes the message ID, an interaction ID, the TTL value, and application data, the interaction ID identifying a specific interaction between the message source and the destination computer system, the clock rate of the message source and destination computer system being synchronized.

3. The method as recited in claim 2, wherein the act of updating an interaction cache to indicate that the message has been received comprises an act of storing the message ID and the interaction ID in the interaction cache.

4. The method as recited in claim 1, further comprising:

an act of sending an acknowledgment that the message was received to the message source subsequent to processing the message.

5. The method as recited in claim 1 wherein, the act of receiving a second copy of the message comprises an act of receiving the second copy of the message prior to expiration of a countdown timer based on the TTL value.

6. The method as recited in claim 1, wherein, the act of receiving a second copy of the message comprises an act of receiving the second copy of the message subsequent to expiration of a countdown timer based on the TTL value.

7. The method as recited in claim 1, wherein the an act of discarding the second copy of the message based on the interaction cache comprises an act of determining that a message ID and an interaction ID included in the second coy of the message are stored in the interaction cache.

8. The method as recited in claim 1, wherein the destination computer system includes a Web server and the message source is a Web browser.

9. The method as recited in claim 1, further comprising:

an act of sending a token that includes an encrypted session key to the message source, the session key being encrypted with a private key of a public/private key pair, the session key for securing the interaction between the message source and the destination computer system.

10. The method as recited in claim 9, further comprising:

an act of removing the interaction from the interaction cache;

an act receiving the security token after the interaction has been removed from the interaction cache;

an act of decrypting the token to reveal the session key; and an act of using the session key to secure the interaction even though the interaction was previously removed from the interaction cache.

\* \* \* \* \*